(12) United States Patent
Yao et al.

(10) Patent No.: US 10,395,656 B2
(45) Date of Patent: Aug. 27, 2019

(54) METHOD AND DEVICE FOR PROCESSING SPEECH INSTRUCTION

(71) Applicant: BAIDU ONLINE NETWORK TECHNOLOGY (BEIJING) CO., LTD., Beijing (CN)

(72) Inventors: Shujie Yao, Beijing (CN); Zejin Hu, Beijing (CN); Jianming Zhao, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 32 days.

(21) Appl. No.: 15/834,760

(22) Filed: Dec. 7, 2017

(65) Prior Publication Data
US 2018/0286396 A1  Oct. 4, 2018

(30) Foreign Application Priority Data

Mar. 29, 2017 (CN) .......................... 2017 1 0198630

(51) Int. Cl.
| | |
|---|---|
| *G10L 15/22* | (2006.01) |
| *G06F 3/00* | (2006.01) |
| *G10L 15/00* | (2013.01) |
| *G10L 15/26* | (2006.01) |
| *G10L 15/16* | (2006.01) |
| *G06N 3/08* | (2006.01) |
| *G06F 17/21* | (2006.01) |
| *G06F 17/27* | (2006.01) |
| *G10L 15/18* | (2013.01) |

(52) U.S. Cl.
CPC .............. *G10L 15/22* (2013.01); *G06F 17/21* (2013.01); *G06F 17/2785* (2013.01); *G06N 3/08* (2013.01); *G10L 15/16* (2013.01); *G10L 15/18* (2013.01); *G10L 15/1815* (2013.01); *G10L 15/26* (2013.01); *G10L 2015/223* (2013.01)

(58) Field of Classification Search
CPC combination set(s) only.
See application file for complete search history.

(56) References Cited

U.S. PATENT DOCUMENTS 6,314,398 B1 * 11/2001 Junqua ................ G10L 15/1822
348/E5.105
6,975,993 B1 * 12/2005 Keiller .................... G10L 15/26
704/275

(Continued)

*Primary Examiner* — Shreyans A Patel
(74) *Attorney, Agent, or Firm* — Hodgson Russ LLP

(57) ABSTRACT

A method and a device for processing a speech instruction are provided. With the method, a speech instruction is recognized so as to generate text information corresponding to the speech instruction. Semantic analysis is performed on the text information so as to obtain a semantic analysis result of the text information. Whether a corresponding operation is executable based on the semantic analysis result of the text information is determined. If it is determined that the corresponding operation is not executable based on the semantic analysis result of the text information, whether the text information belongs to instruction text data is determined. If yes, the text information is corrected so as to obtain corrected text information. Semantic analysis is performed on the corrected text information, and the corresponding operation is executed according to a semantic analysis result of the corrected text information.

5 Claims, 3 Drawing Sheets

(56) References Cited

U.S. PATENT DOCUMENTS

| | | | |
|---|---|---|---|
| 8,219,407 B1* | 7/2012 | Roy | G10L 15/19 |
| | | | 704/275 |
| 2003/0225579 A1* | 12/2003 | Wang | G10L 15/1815 |
| | | | 704/251 |
| 2010/0179812 A1* | 7/2010 | Jang | G10L 15/065 |
| | | | 704/244 |
| 2016/0267128 A1* | 9/2016 | Dumoulin | G06F 16/243 |

* cited by examiner

METHOD AND DEVICE FOR PROCESSING SPEECH INSTRUCTION

CROSS-REFERENCE TO RELATED APPLICATION

This application claims priority to and benefits of Chinese Patent Application Serial No. 201710198630.8, filed with the State Intellectual Property Office of P. R. China on Mar. 29, 2017, the entire content of which is incorporated herein by reference.

FIELD

The present disclosure relates to the field of speech technology, and more particularly, to a method and a device for processing a speech instruction.

BACKGROUND

Artificial intelligence (abbreviated as AI) is a new technical science of researching and developing theories, methods, and technics for simulating, extending and expanding human intelligence. Artificial intelligence is considered as a branch of computer science, which attempts to understand the substance of intelligence and generates a new kind of intelligence machine that can react in a similar way to human intelligence. Researches in the field of AI include robots, language recognition, image recognition, natural language processing, and expert systems, etc.

With developments of artificial intelligence, intelligent speech interactive systems, such as speech interactive TVs and vehicle speech interactive systems, have been widely used in daily life, and hands of people can be released by speech interaction. During speech instruction interaction, whether a speech input of a user can be correctly understood by the intelligent speech interactive system is a key external performance that represents an intelligent level of the system.

In the related art, when a speech recognition result of a speech instruction is obtained by the intelligent speech interactive system, semantic analysis of the speech recognition result may be performed by a semantic analysis module, then a corresponding operation may be executed by an instruction executing module based on a semantic analysis result. However, in some scenarios, sometimes the corresponding operation is not executable by the instruction executing module based on the semantic analysis result. For example, when there is a mistake in the speech recognition result, the intelligent speech interactive system may return an irrelevant result. Here, a user has to adjust the input speech instruction and input the adjusted speech instruction again, and the intelligent speech interactive system may need to process the speech instruction for another time. Thus, not only may processing resource be wasted but also interactive experience of the user is affected.

SUMMARY

The present disclosure aims to solve at least one of the above technical problems to at least some extent.

Accordingly, a first objective of the present disclosure is to provide a method for processing a speech instruction, so that with the method, the text information with which the corresponding operation is not executable may be corrected, and the corresponding operation may be executed based on the semantic analysis result of the corrected text information, thus reducing the operation of a user and improving the user's interactive experience.

A second objective of the present disclosure is to provide an apparatus for processing a speech instruction.

A third objective of the present disclosure is to provide a speech interaction system.

A fourth objective of the present disclosure is to provide a device for processing a speech instruction.

A fifth objective of the present disclosure is to provide a non-transitory computer-readable storage medium.

A sixth objective of the present disclosure is to provide a computer program product.

To achieve the above objectives, it is provided in embodiments according to a first aspect of the present disclosure a method for processing a speech instruction, including: recognizing a speech instruction, so as to generate text information corresponding to the speech instruction; performing semantic analysis on the text information, so as to obtain a semantic analysis result of the text information; determining whether a corresponding operation is executable based on the semantic analysis result of the text information; if it is determined that the corresponding operation is not executable based on the semantic analysis result of the text information, determining whether the text information belongs to instruction text data; if it is determined that the text information belongs to the instruction text data, correcting the text information, so as to obtain corrected text information; and performing semantic analysis on the corrected text information, and executing the corresponding operation according to a semantic analysis result of the corrected text information.

With the method for processing a speech instruction according to embodiments of the present disclosure, when it is determined that the corresponding operation is not executable based on the semantic analysis result of the text information corresponding to the speech instruction, whether the text information belongs to instruction text data is determined. When the text information belongs to instruction text data, the text information is corrected to obtain corrected text information and the semantic analysis may be performed on the corrected text information and the corresponding operation is executed according to the semantic analysis result of the corrected text information. Hence, the text information with which the corresponding operation is not executable is corrected, and the corresponding operation may be executed based on the semantic analysis result of the corrected text information, thus reducing the operation of a user and improving the user's interactive experience.

To achieve the above objectives, it is provided in embodiments according to a second aspect of the present disclosure an apparatus for processing a speech instruction, including: a speech recognition module, configured to recognize a speech instruction, so as to generate text information corresponding to the speech instruction; a semantic analysis module, configured to perform semantic analysis on the text information, so as to obtain a semantic analysis result of the text information; a first determining module, configured to determine whether a corresponding operation is executable based on the semantic analysis result of the text information; a second determining module, configured to determine whether the text information belongs to instruction text data if it is determined that the corresponding operation is not executable based on the semantic analysis result of the text information; a correcting module, configured to correct the text information, so as to obtain corrected text information, if it is determined that the text information belongs to instruction text data; a processing module, configured to perform semantic analysis on the corrected text information, and execute the corresponding operation according to a semantic analysis result of the corrected text information.

With the apparatus for processing a speech instruction according to embodiments of the present disclosure, when it is determined that the corresponding operation is not executable based on the semantic analysis result of the text information corresponding to the speech instruction, whether the text information belongs to instruction text data is determined. When the text information belongs to instruction text data, the text information is corrected to obtain corrected text information and the semantic analysis may be performed on the corrected text information and the corresponding operation is executed according to the semantic analysis result of the corrected text information. Hence, the text information with which the corresponding operation is not executable is corrected, and the corresponding operation may be executed based on the semantic analysis result of the corrected text information, thus reducing the operation of a user and improving the user's interactive experience.

It is provided in embodiments according to a third aspect of the present disclosure a speech interaction system, including the apparatus for processing the speech instruction according to the second aspect of the present disclosure.

With the speech interaction system according to embodiments of the present disclosure, when it is determined that the corresponding operation is not executable based on the semantic analysis result of the text information corresponding to the speech instruction, whether the text information belongs to instruction text data is determined. When the text information belongs to instruction text data, the text information is corrected to obtain corrected text information and the semantic analysis may be performed on the corrected text information and the corresponding operation is executed according to the semantic analysis result of the corrected text information. Hence, the text information with which the corresponding operation is not executable is corrected, and the corresponding operation may be executed based on the semantic analysis result of the corrected text information, thus reducing the operation of a user and improving the user's interactive experience.

It is provided in embodiment according to a fourth aspect of the present disclosure a device for processing a speech instruction, including: a processor; a memory for storing instructions executable by the processor. The processor is configured to perform the acts of: recognizing a speech instruction, so as to generate text information corresponding to the speech instruction; performing semantic analysis on the text information, so as to obtain a semantic analysis result of the text information; determining whether a corresponding operation is executable based on the semantic analysis result of the text information; if it is determined that the corresponding operation is not executable based on the semantic analysis result of the text information, determining whether the text information belongs to instruction text data; if it is determined that the text information belongs to the instruction text data, correcting the text information, so as to obtain corrected text information; performing semantic analysis on the corrected text information, and executing the corresponding operation according to a semantic analysis result of the corrected text information.

It is provided in embodiment according to a fifth aspect of the present disclosure a non-transitory computer-readable storage medium, stored with one or more programs that, when executed by a device, cause the device to perform the method for processing the speech instruction according to the first aspect of the present disclosure.

It is provided in embodiment according to a sixth aspect of the present disclosure a computer program product, when instructions stored in the computer program product are executed by a processor, a method for processing a speech instruction is performed, the method including: recognizing a speech instruction, so as to generate text information corresponding to the speech instruction; performing semantic analysis on the text information, so as to obtain a semantic analysis result of the text information; determining whether a corresponding operation is executable based on the semantic analysis result of the text information; if it is determined that the corresponding operation is not executable based on the semantic analysis result of the text information, determining whether the text information belongs to instruction text data; if it is determined that the text information belongs to the instruction text data, correcting the text information, so as to obtain corrected text information; and performing semantic analysis on the corrected text information, and executing the corresponding operation according to a semantic analysis result of the corrected text information.

Additional aspects and advantages of embodiments of the present disclosure will be given in part in the following descriptions, become apparent in part from the following descriptions, or be learned from practice of embodiments of the present disclosure.

BRIEF DESCRIPTION OF THE DRAWINGS

The above and/or other aspects and advantages of the present disclosure will become apparent and more readily appreciated from the following descriptions of the embodiments with reference to the drawings, in which.

DETAILED DESCRIPTION

Figure 1:
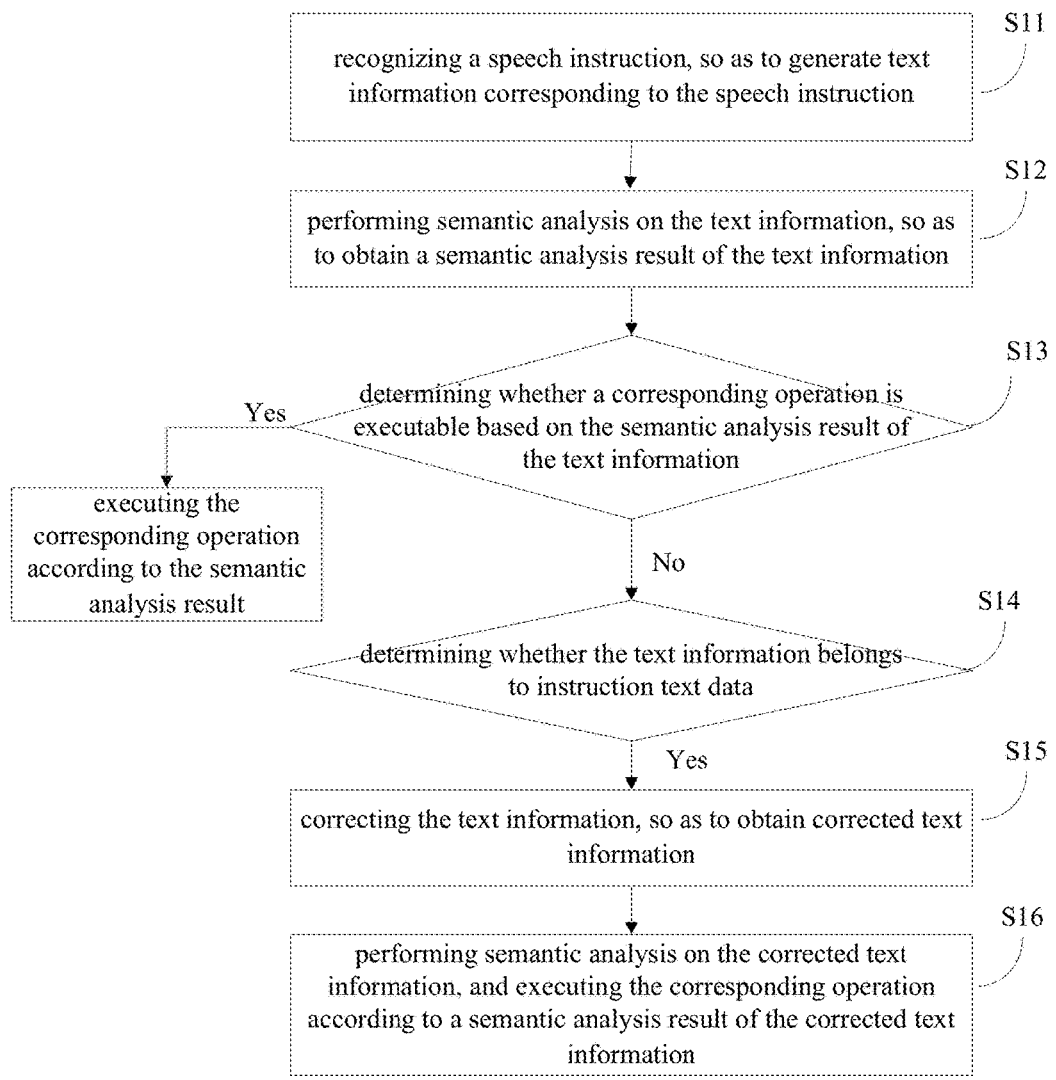
FIG. 1 is a flow chart showing a method for processing a speech instruction according to an embodiment of the present disclosure.

Reference will now be made in detail to exemplary embodiments, examples of which are illustrated in the accompanying drawings, wherein the same or similar elements and the elements having same or similar functions are denoted by like reference numerals throughout the descriptions. Embodiments described herein with reference to drawings are explanatory, serve to explain the present disclosure, and are not construed to limit embodiments of the present disclosure.

In the present disclosure, it should be understood that term "a plurality of" means two or more than two; terms such as "first" and "second" are used herein only for purposes of description and are not intended to indicate or imply relative importance or significance or to imply the number of indicated technical features.

The method, apparatus and system for processing a speech instruction according to embodiments of the present disclosure will be described below with reference to drawings.

FIG. 1 is a flow chart showing a method for processing a speech instruction according to an embodiment of the present disclosure. It should be noted that the method for processing a speech instruction according to this embodiment may be applied to a terminal with a speech interaction system. In detail, the terminal may be a hardware device with an operation system, for example, a personal computer, a mobile phone, a tablet computer or a vehicle terminal, etc. A man-machine interactive interface may be provided in the terminal to supply speech service.

As shown in FIG. 1, the method for processing a speech instruction according to embodiments of the present disclosure may include following acts.

At block S11, a speech instruction is recognized, so as to generate text information corresponding to the speech instruction.

When a user needs speech interaction, the speech instruction may be input into the man-machine interactive interface. Then, the speech instruction is recognized to generate the text information corresponding to the speech instruction.

At block S12, semantic analysis is performed on the text information, so as to obtain a semantic analysis result of the text information.

In detail, semantic analysis process of the text information may include analyzing the input text information and converting language text to structured semantic structure text, or even to a more precise data format which can be understood and operated by a machine, so that the machine can "understand" the human language.

For example, assuming that the text information corresponding to the speech instruction is "play Yewen by Zhen Zidan", when semantic analysis is performed on the text information, the obtained semantic analysis result may be as follows.

```
{
    "domain" : "video",
    "intent" : "play",
    "object" : {
        "_name" : "Yewen",
        "actor" : [ "Zhen Zidan" ],
        "name" : "Yewen"
    },
    "score" : 0.650
}.
```

For another example, assuming that the text information corresponding to the speech instruction is "add subway station after Wudaokou", when semantic analysis is performed on the text information, the obtained semantic analysis result may be as follows.

```
{
    "domain":"interactive_correct",
    "intent":" add",
    "object":{
        "keywords": [
            {
                " pre_ope_error " : "Wudaokou",
                " relative_pos":after
                " after_ope_correct" : "subway station"
            }
        ]
    }.
```

It should be understood that the semantic analysis of the text information corresponding to the speech instruction may be performed by a method in the related art, and thus will not be elaborated here.

At block S13, whether a corresponding operation is executable based on the semantic analysis result of the text information is determined.

As an exemplary embodiment, after the semantic analysis result of the text information is obtained, whether an operation parameter for executing the corresponding operation is included in the semantic analysis result is determined. If the operation parameter is not included, it is determined that the corresponding operation is not executable based on the semantic analysis result of the text information, i.e. the semantic analysis result of the text information is determined as "null".

As an exemplary embodiment, after the semantic analysis result of the text information is obtained, whether an operation parameter for executing the corresponding operation is included in the semantic analysis result may be determined. If the operation parameter is included, it is further determined whether the corresponding operation can be achieved based on the operation parameter for executing the corresponding operation. If the corresponding operation cannot be achieved, it is determined that the corresponding operation is not executable based on the semantic analysis result of the text information, i.e. based on the semantic analysis result, the corresponding operation is not executable and a task indicated by the speech instruction cannot be fulfilled.

For example, assuming a segment of text to be edited reads "his dad is a teacher". The obtained text information corresponding to the speech instruction is "daddy was changed to mom". After the semantic analysis result of the text information is obtained, since the text to be edited does not contain "daddy", a modification operation of the text to be edited is not executable according to the semantic analysis result. Therefore, it may be determined that the modification operation of the text to be edited is not executable based on the semantic analysis result of the text information.

At block S14, if it is determined that the corresponding operation is not executable based on the semantic analysis result of the text information, whether the text information belongs to instruction text data is determined.

In an embodiment of the present disclosure, when it is determined that the corresponding operation is not executable based on the semantic analysis result of the text information, whether the text information belongs to instruction text data may be determined by a pre-trained convolutional neural network (CNN) model. That is, the text information is input into the pre-trained CNN model, and whether the text information belongs to instruction text data is determined by the pre-trained CNN model.

In an embodiment, the CNN model is trained according to instruction text data and non-instruction text data.

In detail, the instruction text data refer to text data including instruction sentence patterns.

As an exemplary embodiment, a CNN model training process may include collecting instruction text data and non-instruction text data; and training the CNN model according to the collected instruction text data and non-instruction text data so as to obtain parameters of the CNN model.

In detail, firstly, the instruction text data and the non-instruction text data are collected as a positive sample (label 1) and a negative sample (label 0) of training data. Then, format conversion may be performed on the training data by a deep learning platform based on PaddlePaddle (parallel distributed deep learning, an open source deep learning framework developed by Baidu), so as to convert the data into a format that can be processed by PaddlePaddle. A text classification network structure of CNN may be configured and the CNN model is trained according to the network structure based on the instruction text data and the non-instruction text data, so as to obtain parameters of the CNN model.

It should be understood that, if it is determined that the corresponding operation can be executed based on the semantic analysis result of the text information, then the corresponding operation is directly executed based on the semantic analysis result of the text information.

At block S15, if it is determined that the text information belongs to instruction text data, the text information may be corrected to obtain corrected text information.

In an embodiment of the present disclosure, a plurality of ways is provided to correct the text information to obtain the corrected text information, which can be selected according to actual applications. There are no limits on that in the present disclosure, and some exemplary ways will be illustrated as follows.

In a first way, the text information may be corrected based on an instruction text correcting rule, so as to obtain the corrected text information.

In detail, the instruction text correcting rule may be compiled according to instruction sentence patterns and high frequency error information in advance.

In an embodiment, when it is determined that the text information belongs to instruction text data, an erroneous instruction keyword in the text information may be located according to an instruction text matching rule, and the corrected text information may be obtained by rewriting the erroneous instruction keyword according to the high frequency error information.

In detail, the instruction text matching rule may be generalized in advance according to information such as sentence patterns, phonetic transcriptions, and regular patterns of speech recognition errors.

For example, assuming that a speech instruction in Chinese reads "把爸改成妈妈" (change dad to mom). Since "把" (pronounced as [ba]) and "爸" (pronounced as [ba]) are pronounced quite alike in Chinese, due to a speech recognition error of a homophone, the instruction may be wrongly recognized as "爸爸改成妈妈" (daddy was changed to mom) (erroneous instruction text data). When the text information is determined to be instruction text data, pattern matching may be performed on the erroneous instruction text data and the instruction text matching rule, and a rule corresponding to the instruction text data may be determined as "[ba] [X] [改成] [X]" ([change] [X] to [X]). In this way, the first character "爸" in the recognized instruction corresponding to pronunciation [ba] may be corrected to a correct instruction keyword "把", and the corrected text information is "把爸改成妈妈" (change dad to mom).

In a second way, the text information may be corrected based on a pre-trained instruction text correcting model, so as to obtain the corrected text information.

In an embodiment, the instruction text correcting model is obtained by collecting instruction text error-correction pairs and training according to the instruction text error-correction pairs.

In detail, when it is determined that the text information belongs to instruction text data, the text information may be input into the instruction text correcting model. The erroneous instruction text may be corrected to a correct instruction text by sequence labeling based on the instruction text correcting model.

In a third way, the text information may be sent to a terminal of a correcting personnel, so that the correcting personnel can correct the text information, then corrected text information from the terminal is received.

At block S16, semantic analysis is performed on the corrected text information, and the corresponding operation is executed according to a semantic analysis result of the corrected text information.

For example, assuming that a speech instruction cannot be correctly understood due to a keyword error caused by speech recognition, and the obtained text information corresponding to the speech instruction in Chinese is "再说前边加上单人旁的他" (add "he" before "says again"). The actual intent of "在说前边加 上单人旁的他" (add he before is saying) is not executable according to the semantic analysis result corresponding to the text information. In this case, the text information may be first corrected based on the pre-trained instruction text correcting model or the instruction text correcting rule. Assuming that the corrected text information is "在说前边加 上单人旁的他", after semantic analysis of the corrected text information is performed, the operation of "'在说前边加上 单人旁的他" may be executed according to the semantic analysis result of the corrected text information.

For another example, assuming a segment of text to be edited in Chinese reads "他爸是老师" (his dad is a teacher). The obtained text information corresponding to the speech instruction is "爸爸改成妈" (daddy was changed to mom). After the semantic analysis result of the text information is obtained, since the text to be edited does not contain "爸爸" (daddy), a modification operation of the text to be edited is not executable according to the semantic analysis result. Therefore, it may be determined that the modification operation of the text to be edited is not executable based on the semantic analysis result of the text information. Assuming that the text information is corrected based on the pre-trained instruction text correcting model or the instruction text correcting rule and the corrected text information "把爸改成妈" (change dad to mom) is obtained. Then, after semantic analysis is performed on the corrected text information, the modification operation of the text to be edited can be achieved.

In summary, with the method for processing a speech instruction according to embodiments of the present disclosure, when it is determined that the corresponding operation is not executable based on the semantic analysis result of the text information corresponding to the speech instruction, whether the text information belongs to instruction text data is determined. When the text information belongs to instruction text data, the text information is corrected to obtain corrected text information and the semantic analysis may be performed on the corrected text information, and thus the corresponding operation is executed according to the semantic analysis result of the corrected text information. Hence, the text information with which the corresponding operation is not executable is corrected, and the corresponding operation may be executed based on the semantic analysis result of the corrected text information, thus reducing the operation of a user and improving the user's interactive experience.

To achieve the above embodiments, according to a second aspect of the present disclosure, an apparatus for processing a speech instruction is also provided.

Figure 2:
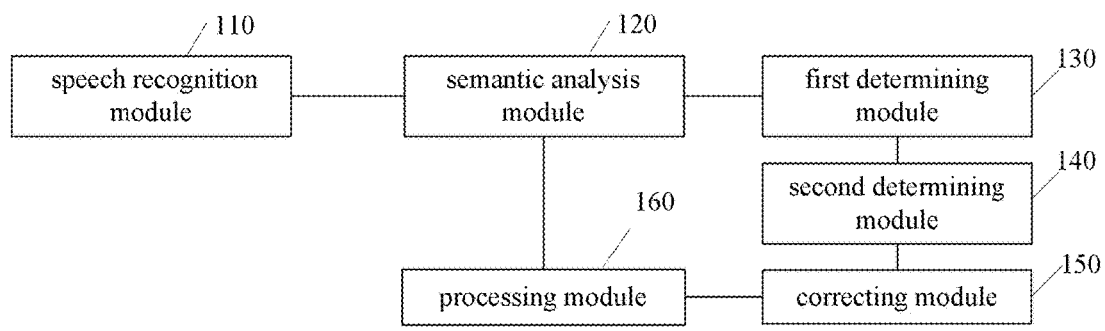
FIG. 2 is a block diagram illustrating an apparatus for processing a speech instruction according to an embodiment of the present disclosure.

FIG. 2 is a block diagram illustrating an apparatus for processing a speech instruction according to an embodiment of the present disclosure.

As illustrated in FIG. 2, the apparatus for processing a speech instruction according to embodiments of the present disclosure may include a speech recognition module 110, a semantic analysis module 120, a first determining module 130, a second determining module 140, a correcting module 150 and a processing module 160.

The speech recognition module 110 is configured to recognize a speech instruction, so as to generate text information corresponding to the speech instruction.

The semantic analysis module 120 is configured to perform semantic analysis on the text information, so as to obtain a semantic analysis result of the text information.

The first determining module 130 is configured to determine whether a corresponding operation is executable based on the semantic analysis result of the text information.

The second determining module 140 is configured to determine whether the text information belongs to instruction text data if it is determined that the corresponding operation is not executable based on the semantic analysis result of the text information.

The correcting module 150 is configured to correct the text information, so as to obtain corrected text information, if it is determined that the text information belongs to instruction text data.

The processing module 160 is configured to perform semantic analysis on the corrected text information, and execute the corresponding operation according to a semantic analysis result of the corrected text information.

In an embodiment of the present disclosure, the second determining module 140 is configured to determine whether the text information belongs to instruction text data by a pre-trained convolutional neural network (CNN) model.

In an embodiment, the CNN model is trained according to instruction text data and non-instruction text data.

In detail, the instruction text data refer to text data including instruction sentence patterns.

In an embodiment of the present disclosure, the correcting module 150 is configured to correct the text information based on an instruction text correcting rule, so as to obtain the corrected text information.

In another embodiment of the present disclosure, the correcting module 150 is configured to correct the text information based on a pre-trained instruction text correcting model, so as to obtain the corrected text information.

In detail, the instruction text correcting model is obtained by collecting instruction text error-correction pairs and training according to the instruction text error-correction pairs.

In detail, when it is determined that the text information belongs to instruction text data, the text information may be input into the instruction text correcting model by the correcting module 150. An erroneous instruction text may be corrected to a correct instruction text by sequence labeling based on the instruction text correcting model.

In an embodiment of the present disclosure, the correcting module 150 is configured to locate an erroneous instruction keyword in the text information according to an instruction text matching rule, and to rewrite the erroneous instruction keyword according to the high frequency error information to obtain the corrected text information.

It should be understood that the descriptions of the method for processing a speech instruction in the above embodiments may also apply to the apparatus for processing a speech instruction according to embodiments of the present disclosure, which will not be elaborated here.

With the apparatus for processing a speech instruction according to embodiments of the present disclosure, when it is determined that the corresponding operation is not executable based on the semantic analysis result of the text information corresponding to the speech instruction, whether the text information belongs to instruction text data is determined. When the text information belongs to instruction text data, the text information is corrected to obtain corrected text information and the semantic analysis may be performed on the corrected text information and the corresponding operation is executed according to the semantic analysis result of the corrected text information. Hence, the text information with which the corresponding operation is not executable is corrected, and the corresponding operation may be executed based on the semantic analysis result of the corrected text information, thus reducing the operation of a user and improving the user's interactive experience.

To achieve the above embodiments, according to a third aspect of the present disclosure, a system for processing a speech instruction is also provided.

The system for processing a speech instruction may include the apparatus for processing a speech instruction according to the second aspect of the present disclosure.

It should be understood that the descriptions of the apparatus for processing a speech instruction in the above embodiments may also apply to the system for processing a speech instruction according to embodiments of the present disclosure, which will not be elaborated here.

With the system for processing a speech instruction according to embodiments of the present disclosure, when it is determined that the corresponding operation is not executable based on the semantic analysis result of the text information corresponding to the speech instruction, whether the text information belongs to instruction text data is determined. When the text information belongs to instruction text data, the text information is corrected to obtain corrected text information and the semantic analysis may be performed on the corrected text information and the corresponding operation is executed according to the semantic analysis result of the corrected text information. Hence, the text information with which the corresponding operation is not executable is corrected, and the corresponding operation may be executed based on the semantic analysis result of the corrected text information, thus reducing the operation of a user and improving the user's interactive experience.

Figure 3:
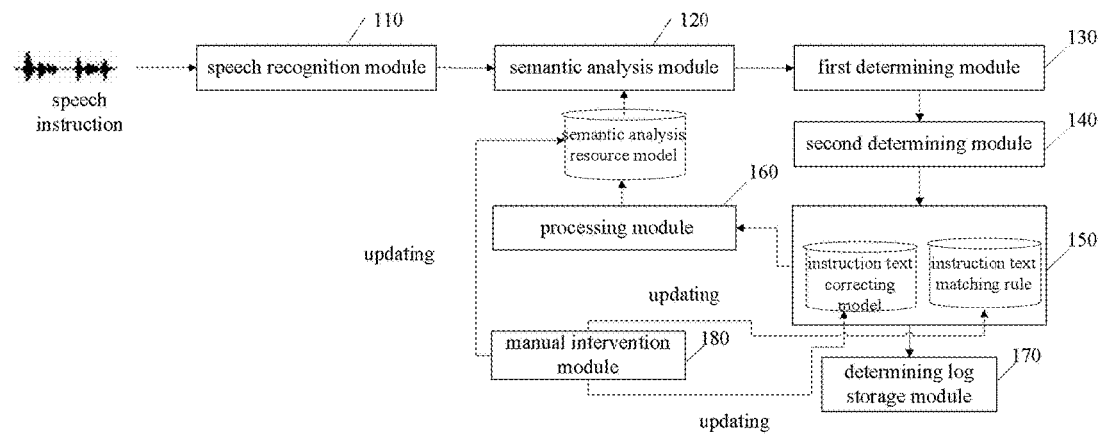
FIG. 3 is a schematic diagram illustrating interactions among modules of a system for processing a speech instruction according to an embodiment of the present disclosure.

FIG. 3 is a schematic diagram illustrating interactions among modules of a system for processing a speech instruction according to an embodiment of the present disclosure.

As illustrated in FIG. 3, the system for processing a speech instruction may include a speech recognition module 110, a semantic analysis module 120, a first determining module 130, a second determining module 140, a correcting module 150, a processing module 160, a determining log storage module 170, and a manual intervention module 180.

Referring to FIG. 3, the semantic analysis module 120 may perform semantic analysis on the speech instruction based on a semantic analysis resource model.

In detail, the determining log storage module 170 is configured to store text information that cannot be corrected by a pre-trained instruction text correcting model or an instruction text matching rule.

The manual intervention module 180 is configured to analyze and document text information beyond the system's analysis capacity manually, and update the semantic analysis resource model, the instruction text correcting model and the instruction text matching rule according to an analysis result, so as to optimize instruction understanding ability of the system.

Figure 4:
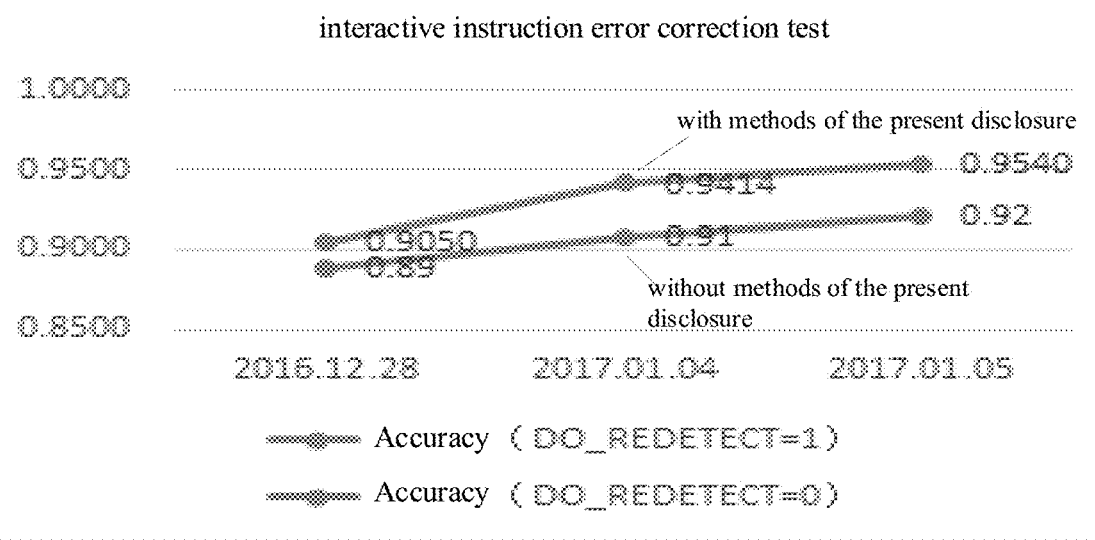
FIG. 4 is a schematic diagram illustrating a comparison result of interactive instruction error correction rate between systems for processing speech instructions with and without the method according to embodiments of the present disclosure.

A comparison result of interactive instruction error correction rate between systems for processing speech instructions with and without methods according to embodiments of the present disclosure is illustrated as FIG. 4. Referring to FIG. 4, compared to the system without methods according to embodiments of the present disclosure, the system for processing a speech instruction with methods according to embodiments of the present disclosure may improve instruction analysis and execution success rates under circumstance that the speech instruction is wrongly recognized or an erroneous operation is demanded.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples. In addition, those skilled in the art could combine or associate different embodiments, examples or characters of different embodiments or examples, as long as there are no contradictories.

In addition, terms such as "first" and "second" are used herein only for purposes of description and are not intended to indicate or imply relative importance or significance or to imply the number of indicated technical features. Thus, the feature defined with "first" and "second" may comprise one or more of this feature either in a way of imply or indicate. In the description of the present disclosure, "a plurality of" means two or more than two, unless specifically and particularly prescribed otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, wherein the order of execution may differ from that which is depicted or discussed, including according to involved function, executing concurrently or with partial concurrence or in the contrary order to perform the function, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer-readable medium comprise but are not limited to: an electronic connection (an electronic device) with one or more wires, a portable computer enclosure (a magnetic device), a random access memory (RAM), a read-only memory (ROM), an erasable programmable read-only memory (EPROM or a flash memory), an optical fiber device and a portable compact disk read-only memory (CDROM). In addition, the computer-readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs, the programs may be stored in a computer-readable storage medium, and the programs comprise one or a combination of the steps in the method embodiments of the present disclosure when running on a computer.

In addition, each function cell of the embodiments of the present disclosure may be integrated into a processing module, or these cells may be separate physical existence, or two or more cells are integrated into a processing module. The integrated module as described above may be achieved in a form of hardware, or may be achieved in a form of software functional module. When the integrated module is realized in a form of software function module and is sold or used as a standalone product, the integrated module may be stored in a computer-readable storage medium.

The storage medium mentioned above may be read-only memories, magnetic disks, CD, etc. Although embodiments of present disclosure have been shown and described above, it should be understood that above embodiments are just explanatory, and cannot be construed to limit the present disclosure, for those skilled in the art, changes, alternatives, and modifications can be made in the embodiments without departing from spirit, principles, and scope of the present disclosure.

What is claimed is:

1. A method for processing a speech instruction, comprising:
    recognizing a speech instruction, so as to generate text information corresponding to the speech instruction;
    performing semantic analysis on the text information, so as to obtain a semantic analysis result of the text information;
    determining whether a corresponding operation is executable based on the semantic analysis result of the text information;
    if it is determined that the corresponding operation is not executable based on the semantic analysis result of the text information, determining whether the text information belongs to instruction text data;
if it is determined that the text information belongs to the instruction text data, correcting the text information, so as to obtain corrected text information;
performing semantic analysis on the corrected text information, and executing the corresponding operation according to a semantic analysis result of the corrected text information;
wherein correcting the text information so as to obtain corrected text information comprises:
correcting the text information based on an instruction text correcting rule, so as to obtain the corrected text information;
wherein correcting the text information based on an instruction text correcting rule so as to obtain the corrected text information comprises:
locating an erroneous instruction keyword in the text information according to an instruction text matching rule;
rewriting the erroneous instruction keyword according to high frequency error information, so as to obtain the corrected text information.

2. The method according to claim 1, wherein determining whether the text information belongs to instruction text data comprises:
determining whether the text information belongs to instruction text data by a pre-trained convolutional neural network model.

3. A device for processing a speech instruction, comprising:
a processor;
a memory for storing instructions executable by the processor;
wherein the processor is configured to perform the acts of:
recognizing a speech instruction, so as to generate text information corresponding to the speech instruction;
performing semantic analysis on the text information, so as to obtain a semantic analysis result of the text information;
determining whether a corresponding operation is executable based on the semantic analysis result of the text information;
if it is determined that the corresponding operation is not executable based on the semantic analysis result of the text information, determining whether the text information belongs to instruction text data;
if it is determined that the text information belongs to the instruction text data, correcting the text information, so as to obtain corrected text information;
performing semantic analysis on the corrected text information, and executing the corresponding operation according to a semantic analysis result of the corrected text information;
wherein the processor corrects the text information so as to obtain corrected text information by:
correcting the text information based on an instruction text correcting rule, so as to obtain the corrected text information;
wherein correcting the text information based on an instruction text correcting rule so as to obtain the corrected text information comprises:
locating an erroneous instruction keyword in the text information according to an instruction text matching rule;
rewriting the erroneous instruction keyword according to high frequency error information, so as to obtain the corrected text information.

4. The device according to claim 3, wherein the processor determines whether the text information belongs to instruction text data by:
determining whether the text information belongs to instruction text data by a pre-trained convolutional neural network model.

5. A non-transitory computer-readable storage medium, stored with one or more programs that, when executed by a device, cause the device to perform a method for processing a speech instruction, the method comprising:
recognizing a speech instruction, so as to generate text information corresponding to the speech instruction;
performing semantic analysis on the text information, so as to obtain a semantic analysis result of the text information;
determining whether a corresponding operation is executable based on the semantic analysis result of the text information;
if it is determined that the corresponding operation is not executable based on the semantic analysis result of the text information, determining whether the text information belongs to instruction text data;
if it is determined that the text information belongs to the instruction text data, correcting the text information, so as to obtain corrected text information;
performing semantic analysis on the corrected text information, and executing the corresponding operation according to a semantic analysis result of the corrected text information;
wherein correcting the text information so as to obtain corrected text information comprises:
correcting the text information based on an instruction text correcting rule, so as to obtain the corrected text information;
wherein correcting the text information based on an instruction text correcting rule so as to obtain the corrected text information comprises:
locating an erroneous instruction keyword in the text information according to an instruction text matching rule;
rewriting the erroneous instruction keyword according to high frequency error information, so as to obtain the corrected text information.

* * * * *